United States Patent [19]

Takagi

[11] Patent Number: 5,329,522
[45] Date of Patent: Jul. 12, 1994

[54] SPACE-DIVISION MULTIPLEX COMMUNICATION METHOD OF EXECUTING MULTIPLEX COMMUNICATION

[75] Inventor: Tasuku Takagi, Sendai, Japan

[73] Assignee: Small Power Communication Systems Research Laboratories Co., Ltd., Sendai, Japan

[21] Appl. No.: 103,311

[22] Filed: Aug. 9, 1993

Related U.S. Application Data

[63] Continuation of Ser. No. 672,418, Mar. 20, 1991, abandoned.

[30] Foreign Application Priority Data

Mar. 23, 1990 [JP] Japan ................. 2-71930

[51] Int. Cl.⁵ .................... H04J 3/00; H04B 1/56
[52] U.S. Cl. .................... 370/29; 455/57.1; 342/359; 342/353; 370/77
[58] Field of Search ........... 370/70, 50, 100.1, 77, 370/29; 455/55.1, 60, 105, 56.1, 57.1, 58.1, 58.2, 59; 343/723, 732, 728, 888, 866, 855; 342/362, 363, 365, 367, 354, 351, 359, 360, 423, 428, 353, 429

[56] References Cited

U.S. PATENT DOCUMENTS

| | | | |
|---|---|---|---|
| 3,824,597 | 7/1974 | Berg | 370/24 |
| 4,019,184 | 4/1977 | Dorey | 342/418 |
| 4,134,116 | 1/1979 | Wild | 342/360 |
| 4,336,542 | 6/1982 | Bielli et al. | 342/362 |
| 4,389,647 | 6/1983 | Fanuele et al. | 342/194 |
| 4,446,462 | 5/1984 | Ouellette et al. | 455/59 |
| 4,617,570 | 10/1986 | Gutleber | 342/429 |
| 4,806,932 | 2/1989 | Bechtel | 342/35 |
| 4,907,218 | 3/1990 | Inoue et al. | 455/60 |
| 5,017,925 | 5/1991 | Bertiger et al. | 342/353 |
| 5,128,669 | 7/1992 | Dadds et al. | 342/42 |

OTHER PUBLICATIONS

Patent Abstracts of Japan, vol. 9, No. 75, (E-306)[1798], Apr. 4, 1985, & JP-A-59 211 344, Nov. 30, 1984, Y. Doui, et al., "Multi-Direction Time Division Radio Communication System".

IEEE Transactions on Vehicular Technology, Feb. 1990, vol. 39, No. 1, pp. 56-57, S. C. Swales, et al., "The Performance Enhancement of Multibeam Adaptive Base-Station Antennas for Cellular Land Mobile Radio Systems".

Patent Abstracts of Japan, vol. 10, No. 113, (E-399) [2170], Apr. 16, 1986, & JP-A-60 248039, Dec. 7, 1985, M. Aihara, et al., "Digital Communication Systems".

Patent Abstracts of Japan, vol. 10, No. 8, (E-373) ə2065], Jan. 14, 1986, & JP-A-60 171 835, Sep. 5, 1985, T. Riyuu, "Demand Asign Scanning Beam Communication System".

Primary Examiner—Benedict V. Safourek
Assistant Examiner—Dang Ton
Attorney, Agent, or Firm—Oblon, Spivak, McClelland, Maier & Neustadt

[57] ABSTRACT

In a space-division multiplex communication method of executing multiplex communication according to this invention, a plurality of radio beams a—a' to d—d' radiated at same frequency in different directions and rotated at same rotational angular speed $\omega$ are independently received in synchronism with the rotational angular speed $\omega$ by a plurality of communication terminals R1 to R3 arranged at arbitrary positions in a space where the radio beams can be received, thereby realizing unidirectional multiplex communication using the same frequency. Interstation bidirectional multiplex communication is performed by introducing a frequency-division system to the communication terminals R1 to R3 of the unidirectional multiplex communication. The space-division multiplex communication method can effectively use a frequency by a multiplex communication system of space-dividing a radio beam.

4 Claims, 4 Drawing Sheets

SPACE-DIVISION MULTIPLEX COMMUNICATION METHOD OF EXECUTING MULTIPLEX COMMUNICATION

This application is a continuation of application Ser. No. 07/672,418, filed on Mar. 20, 1991, now abandoned.

BACKGROUND OF THE INVENTION

1. Field of the Invention

The present invention relates to space-division multiplex communication method in which a plurality of rotationally radiated radio beams consisting of the same frequency are transmitted and received between a plurality of stations, thereby executing time-division multiplex communication.

2. Description of the Related Art

In general, a multiplex communication method of time-dividing a radio beam by using a radiation beam system in which radio beams having the same frequency and carrying different pieces of information are radiated in a plurality of directions and a method of performing interstation bidirectional multiplex communication by introducing a frequency-division system to the multiplex communication method have not yet been established.

An example of conventional techniques using the rotation of a beam is a radar. FIG. 5 shows an example of the radar.

Referring to FIG. 5, a station is provided to radiate and receive a radio beam. This station radiates a radio beam while rotating a beam. If an object is present in the radiation direction of the radiated radio beam, the radio beam is reflected by the object. The station receives the reflected radio beam and determines the position of the object in accordance with the incoming direction and the reception level of the received radio beam.

From a viewpoint of communication, a frequency- or time-division communication technique is available.

FIG. 6 is a view for explaining an arrangement of a conventional frequency-division multiplex communication system. Referring to FIG. 6, an information transmission station T for transmitting information is provided.

The information transmission station T non-directionally radiates a plurality of radio beams having different frequencies.

A plurality of receivers R1, R2, R3, ..., Rn each for receiving a radio beam having a predetermined frequency are located within a distance range in that the above transmitted radio beams can be received. The receivers R1, R2, R3, ..., Rn receive radio beams having frequencies f1, f2, f3, ..., fn, respectively.

In the above communication system, a frequency to be used in transmission performed by the information transmission station must be provided for each receiver. This goes for an arrangement in which a plurality of information transmission stations are provided.

FIG. 7 is a view for explaining an arrangement of a conventional time-division multiplex communication system, and FIG. 8 is a view showing transmission data used in the system. Referring to FIG. 7, radio beams are non-directionally radiated from an information transmission station for transmitting information.

A plurality of receivers R1, R2, R3, ..., Rn for receiving the radiated radio beams are located within a distance range in that they can receive the above radiated radio beams. The receivers R1, R2, R3, ..., Rn receive information at timings 1, 2, 3, ..., n shown in FIG. 8, respectively. Referring to FIG. 8, information at timing 0 is a sync signal to be used by each receiver for information extraction.

SUMMARY OF THE INVENTION

It is, therefore, an object of the present invention to provide a space-division multiplex communication method capable of effectively using a frequency by time-dividing a radio beam and using a multiplex communication method.

That is, a space-division multiplex communication method according to the present invention comprises the steps of outputting a plurality of radio beams, simultaneously radiated at the same frequency in different directions, from a transmission station, rotating the plurality of radio beams at the same rotational angular speed, and allowing a plurality of communication terminals arranged at arbitrary positions in a space, in which the plurality of radio beams radiated in the different directions can be received, to independently receive the plurality of radio beams in synchronism with the rotational angular speed, whereby unidirectionally executing multiplex communication of the same frequency simultaneously for the communication terminals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Embodiments of the present invention will be described in detail below with reference to the accompanying drawings.

First, radiated radio beams will be briefly described below.

Figure 1:
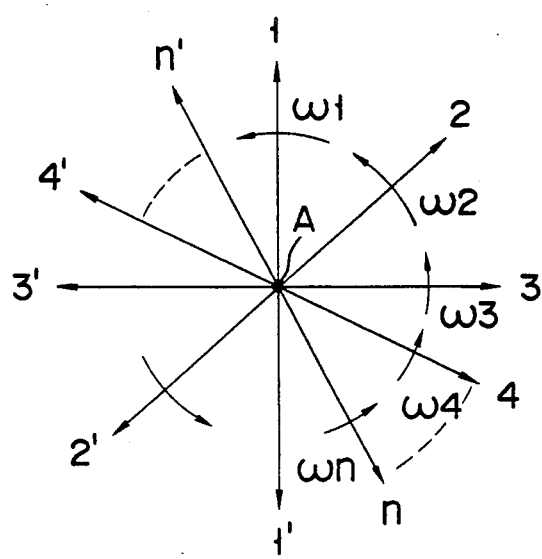
FIG. 1 is a schematic view for explaining a practical example of radiated radio beams according to the present invention.

FIG. 1 is a schematic view showing radiated radio beams according to the embodiment of the present invention. Referring to FIG. 1, reference symbol A denotes an antenna viewed in a direction perpendicular to the drawing surface, and arrows 1—1', 2—2', 3—3', 4—4', ..., n—n' denote directions of beams radiated from the antenna A.

In FIG. 1, a plurality of beams are radiated in a plurality of arbitrary directions as indicated by the arrow directions. The arrow direction 1—1' is rotated at an angular frequency $\omega 1$, the arrow direction 2—2' is rotated at an angular frequency $\omega 2$, and the remaining arrow directions are similarly rotated at angular frequencies $\omega 3$, $\omega 4$, ..., $\omega n$, respectively. Assuming that the radiated radio beams are rotated in this manner, the following description will be made on the basis of thus radiated radio beams.

A unidirectional multiplex communication method will be described below as the first embodiment of the present invention.

Figure 2:
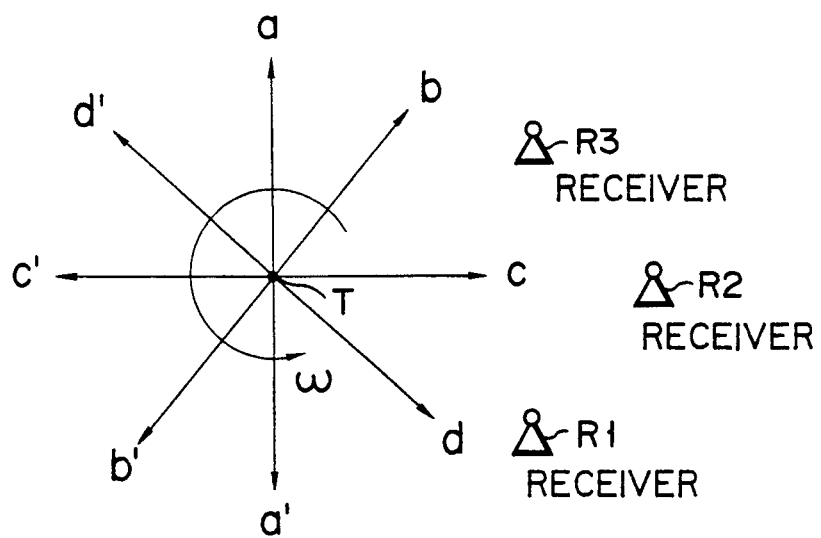
FIG. 2 is a schematic view for explaining a practical example of a unidirectional multiplex communication method according to the present invention.

FIG. 2 is a schematic view for explaining the first embodiment of the present invention. Referring to FIG. 2, an information transmission station T for transmitting information is provided first.

A plurality of radio beams having the same frequency are radiated in directions indicated by arrows a—a', b—b', c—c', and d—d'.

A plurality of receivers R1, R2, and R3 for receiving predetermined radio beams are arranged within a range where they can receive the radio beams. The receivers R1, R2, and R3 receive the radio beams in the arrow directions a—a', b—b', and c—c', respectively. Each of the receivers R1, R2, and R3 has a non-directional receiving antenna. Note that only four radio beams are transmitted from the information transmission station T shown in FIG. 2, but the number of radio beams is not limited to four.

The four radio beams transmitted from the information transmission station T are rotated at an equal angular frequency $\omega$.

The receivers R1, R2, and R3 receive different pieces of information from the information transmission station T. These pieces of information are carried by the radio beams a—a', b—b', and c—c'. The radio beam d—d' is used as a sync signal.

A relationship between the information, the radio beams, and the receivers is assumed as follows:

| Information | Radio Beam | Receiver |
|---|---|---|
| M1 | a—a' | R1 |
| M2 | b—b' | R2 |
| M3 | c—c' | R3 |

For example, the receiver R1 operates only when the radio beam a—a' (or a'—a) carrying information M1 comes to the receiver R1. Since the receiver R1 is set so as not to operate in response to the radio beams b—b' (b'—b) and c—c' (c'—c) similarly coming in a receivable direction of the receiver R1, it does not receive information M2 and information M3.

Similarly, since the receivers R2 and R3 operate only when the radio beams b—b' (b'—b) and c—c' (c'—c) carrying the information M2 and the information M3, respectively, come to them, they do not receive any information except for the set information. This system requires a method of controlling operations of the receivers at suitable timings, and a sync signal is necessary for this purpose. This sync signal will be described below.

Assuming that the above radio beams are rotated at an equal speed at the angular frequency $\omega$ about the information transmission station T, the radio beams sequentially come to each receiver with a predetermined time interval therebetween.

Figure 3:
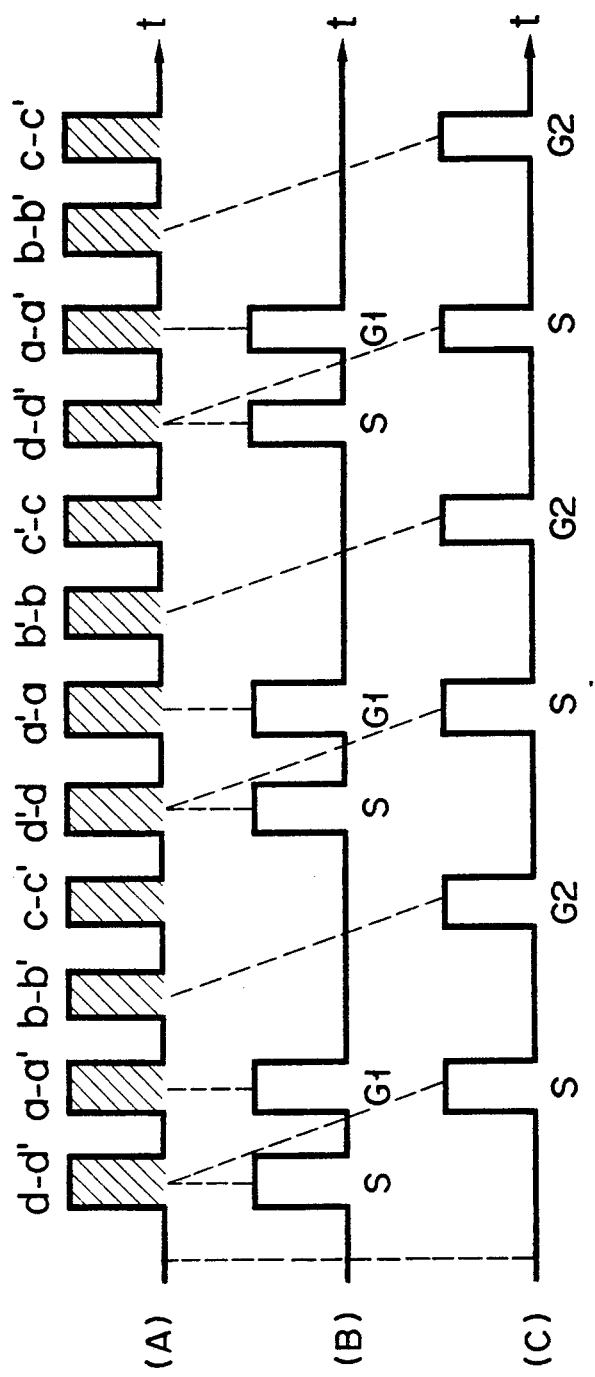
FIG. 3 is a timing chart showing a relationship between gate signals of receivers obtained by using a synchronization radio beam d—d' (d'—d) radiated by the unidirectional multiplex communication method shown in FIG. 2.

Therefore, a plurality of sync signals and operation enable/disable signals for the receivers can be formed with the same time interval as the above predetermined time interval. This is a time-division receiving system for the receivers. FIG. 3 shows a relationship between the operation enable/disable signals (to be referred to as gate signals hereinafter) for the receivers R1, R2, and R3 obtained when the radio beam d—d' (d'—d) is used as a sync signal.

Referring to FIG. 3, a measurement position (A) indicates an incoming relationship between the radio beams a—a' (a'—a), b—b' (b'—b), and c—c' (c'—c) measured at a given point. A measurement position (B) indicates, assuming that the receiver R1 is located at the same point as that of the measurement position (A), timings of the gate signal for the receiver R1 obtained by using the radio beam d—d' (d'—d) as a sync signal, in which reference symbol S denotes a timing of the sync signal; and G1, that of the gate signal for the receiver R2.

A measurement position (C) indicates timings of the sync signal and the gate signal for the receiver 2 obtained when the receiver 2 is located at a point different from that of the receiver R1, in which reference symbol G2 denotes a timing of the gate signal for the receiver R2.

When the three receivers are located as shown in FIG. 2, for example, a time deviation occurs at the measurement position (C) with reference to the receiver R1, and the same thing happens to the receiver R3. As described above, since radio beams rotated at an equal speed at the angular frequency $\omega$ come with a predetermined time interval therebetween, a sync signal and gate signals for the individual receivers can be easily formed on the basis of the time interval. As a result, space-division unidirectional multiplex communication using the same frequency can be performed.

Figure 4:
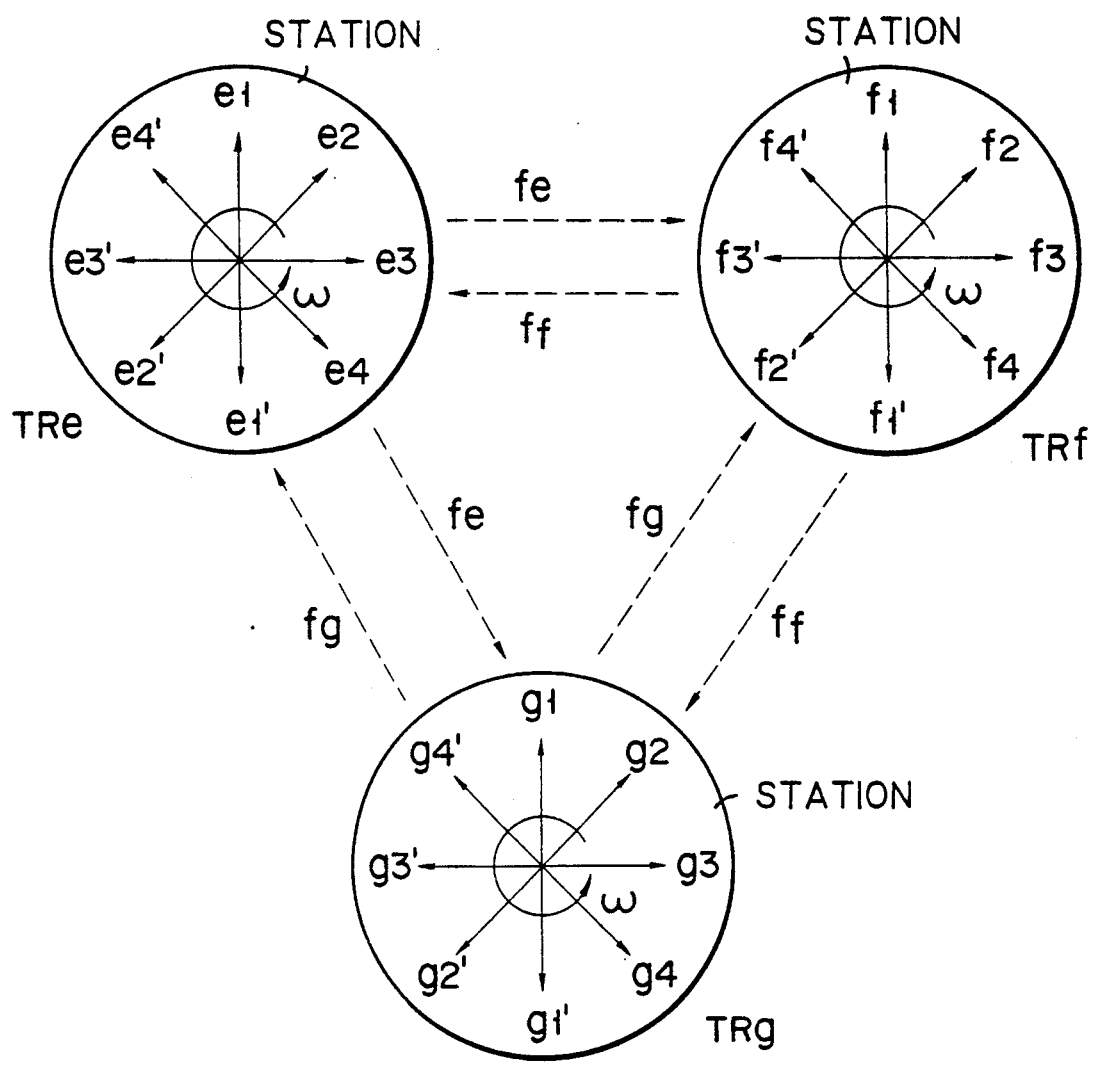
FIG. 4 is a schematic view showing a practical arrangement of an interstation bidirectional multiplex communication method according to the present invention.
Figure 5:
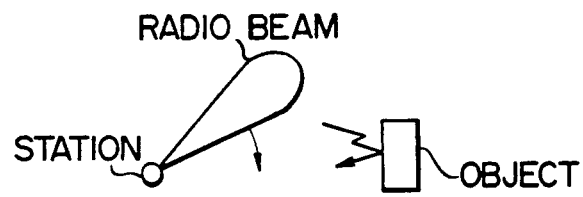
FIG. 5 is a view showing a conventional radar using the rotation of a beam.
Figure 6:
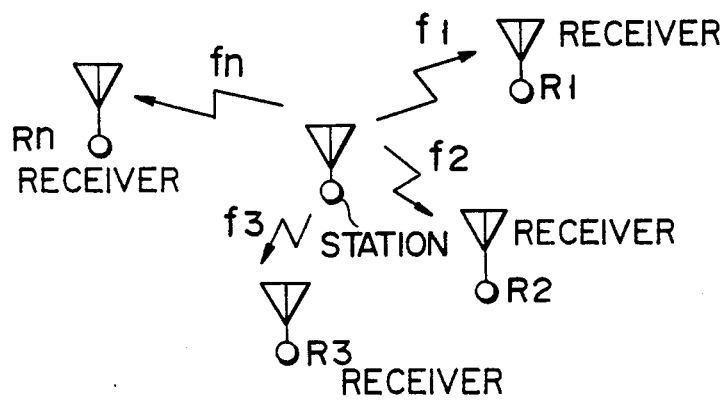
FIG. 6 is a view showing an practical arrangement of a conventional frequency-division communication system.
Figure 7:
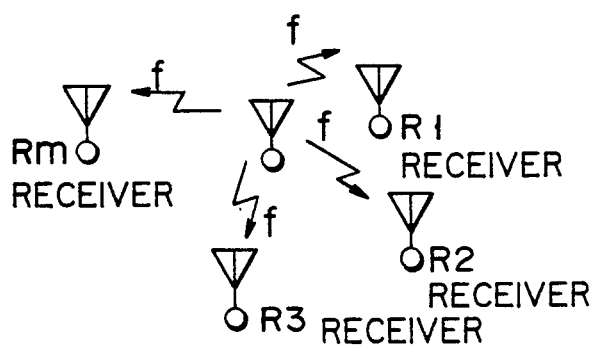
FIG. 7 is a view showing a practical arrangement of a conventional time-division multiplex communication system.
Figure 8:
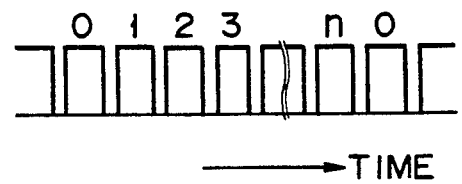
FIG. 8 is a view showing transmission data using the time-division multiplex communication system shown in FIG. 7.

An interstation bidirectional multiplex communication method according to the second embodiment of the present invention will be described below with reference to a schematic view shown in FIG. 4.

This interstation bidirectional multiplex communication method is realized by introducing a frequency-division system to the unidirectional multiplex communication method described above. That is, this interstation bidirectional multiplex communication method simultaneously executes multiplex communication between a plurality of arbitrarily arranged mobile transmitter/receivers by using the same frequency. Although an arrangement in which communication is executed between three transmitter/receivers is illustrated in FIG. 4, the number of the transmitter/receivers is not limited to three. These transmitter/receivers are called stations, and the stations are not limited to transmitter/receivers but may include transmitters and receivers.

Rotational radio beams e1—e1', e2—e2', e3—e3', and e4—e4' from a first station TRe indicate radiation directions and are rotated at a rotational angular speed $\omega$. Similarly, rotational radio beams f1—f1', f2—f2', f3—f3', and f4—f4' from a second station TRf indicate radiation directions and are rotated at the rotational angular speed $\omega$.

Rotational radio beams g1—g1', g2—g2', g3—g3', and g4—g4' from a third station TRg also indicate radiation directions and are rotated at the rotational angular speed $\omega$. Assume that each station has a non-directional receiving antenna.

As is the case of the unidirectional multiplex communication, the rotational radio beams e4—e4', f4—f4', and g4—g4' are used for synchronization in the first, second, and third stations TRe, TRf, and TRg, respectively.

Reference symbols fe, ff, and fg denote carrier frequencies of signals from the first station TRe to the second and third stations TRf and TRg, from the second station TRf to the first and third stations TRe and TRg, and from the third station TRg to the first and second stations TRe and TRf, respectively.

Receivers in the respective stations receive sync beams from the other stations so that the radio beams from the individual stations are rotated in synchronism with each other.

Each receiver is adapted to receive the radio beams transmitted from other stations.

By executing frequency division for each station, the above-mentioned unidirectional multiplex communication method can be applied to each station. As a result, the interstation bidirectional multiplex communication method can be executed as long as the number of stations is technically possible and a range between stations falls within an interstation communication enable range.

To apply a conventional frequency-division method to transmitting means between a plurality of stations, different transmission frequencies must be provided for the individual stations. However, when the interstation bidirectional multiplex communication method of the present invention is used, since only one frequency need be assigned to each station, a frequency can be effectively used.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A time-division multiplex communication method of executing multiplex communication comprising the steps of:

outputting a plurality of radio beams of a same frequency radiated simultaneously from a transmission station in different directions;

rotating each of said plurality of radio beams at same rotational angular speed; and allowing a plurality of communication terminals arranged in an area in which said plurality of radio beams radiated in different directions can be received, said radio beams being time divisionally divided by the number calculated in accordance with rotational angular speed and intentionally radiated from a single one of said plurality of communication terminals to each of the other of said plurality of communication terminals, said single communication terminal selecting at least one of said radio beams repeatedly radiated in synchronism with said time divisional timing and receiving only said radio beam in synchronism with said time divisional timing, thereby unidirectionally executing a multiplexing for other than said single communication terminal.

2. A method according to claim 1, wherein at least one of said plurality of radio beams includes a sync radio beam for providing a timing.

3. A time-division multiplex communication method of executing multiplex communication comprising the steps of:

outputting a plurality of radio beams of a same frequency, simultaneously radiated from a plurality of transmission/reception stations in different directions;

synchronically rotating said plurality of radio beams radiated from each of said transmission/reception stations;

allowing a plurality of transmission/reception stations arranged in an area in which said radio beams can be transmitted and received, a plurality of said radio beams from said transmission/reception stations except one transmission/reception station being time-divisionally divided by a number in accordance with a rotational angular speed so as to intermittently radiate a radio beam on said one transmission/reception station, and said one transmission/reception station selecting and receiving at least one radio beam in synchronism with intermittent timings; and setting said intermittent timings by use of a sync radio beam commonly provided in each of said stations, radio beams of a same frequency radiating from said transmission/reception stations being time-divisionally divided in order for one of transmission/reception stations to receive said time-divided radio beams radiated from the other transmission/reception stations, thereby executing interstation bidirectional multiplex communication.

4. A method according to claim 3, wherein a plurality of radio beams of same frequency radiating interstationally in an unidirection are time-divisionally divided and transmitted or received by each of transmission/reception station, thereby executing bidirectional multiplexed communication.

* * * * *